United States Patent
Gnaedinger

[11] Patent Number: 5,870,861
[45] Date of Patent: Feb. 16, 1999

[54] APPARATUS FOR A WIND RESISTANT FASTENER

[76] Inventor: John P. Gnaedinger, 2020 Chestnut, Apt. 501, Glenview, Ill. 60025

[21] Appl. No.: 835,922

[22] Filed: Apr. 10, 1997

[51] Int. Cl.$^6$ .................................................... E04B 7/04
[52] U.S. Cl. ........................... 52/93.1; 52/23; 52/DIG. 11
[58] Field of Search ............................ 52/698, 23, 167.1, 52/DIG. 11, 167.3

[56] References Cited

U.S. PATENT DOCUMENTS

| | | | |
|---|---|---|---|
| 3,590,540 | 7/1971 | Connell et al. | |
| 3,691,703 | 9/1972 | Barnes | 52/23 |
| 3,830,024 | 8/1974 | Warnke | 52/23 |
| 4,320,605 | 3/1982 | Carlson et al. | 52/94 |
| 4,472,916 | 9/1984 | Krebs . | |
| 5,257,483 | 11/1993 | Netek . | |
| 5,311,712 | 5/1994 | Accousti | 52/259 |
| 5,355,640 | 10/1994 | Frye | 52/23 |
| 5,384,993 | 1/1995 | Phillips | 52/DIG. 11 X |
| 5,444,952 | 8/1995 | Jackson | 52/167.1 X |
| 5,531,054 | 7/1996 | Ramirez | 52/DIG. 11 X |
| 5,537,786 | 7/1996 | Lozier et al. | 52/23 |
| 5,603,186 | 2/1997 | Zaffino | 52/DIG. 11 X |
| 5,608,992 | 3/1997 | Floyd | 52/23 X |

*Primary Examiner*—Christopher Kent
*Assistant Examiner*—Yvonne Horton-Richardson
*Attorney, Agent, or Firm*—Michael R. McKenna

[57] ABSTRACT

An apparatus for a wind resistant fastener for fastening a roof structure of a building to an upstanding exterior wall comprising a substantially vertical securing mechanism disposed adjacent to the wall to serve as an auxiliary fastener between the roof structure and the wall. Two primary preferred embodiments which may be employed separately or together include continuous vertical batten strips disposed on the wall and extending to the roof structure and the foundation, and a high tensile strength wall covering connecting the roof structure, the wall and the foundation.

20 Claims, 2 Drawing Sheets

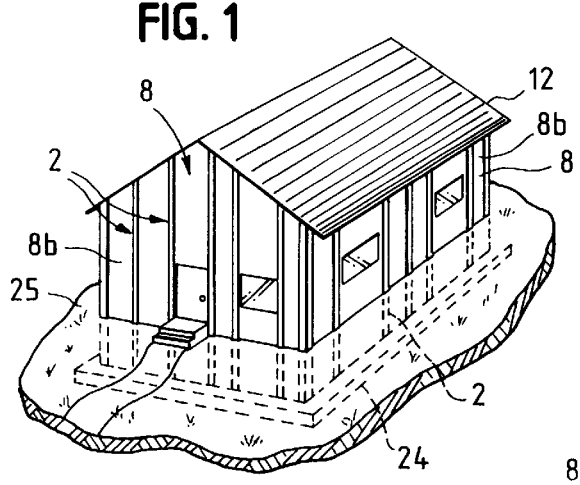
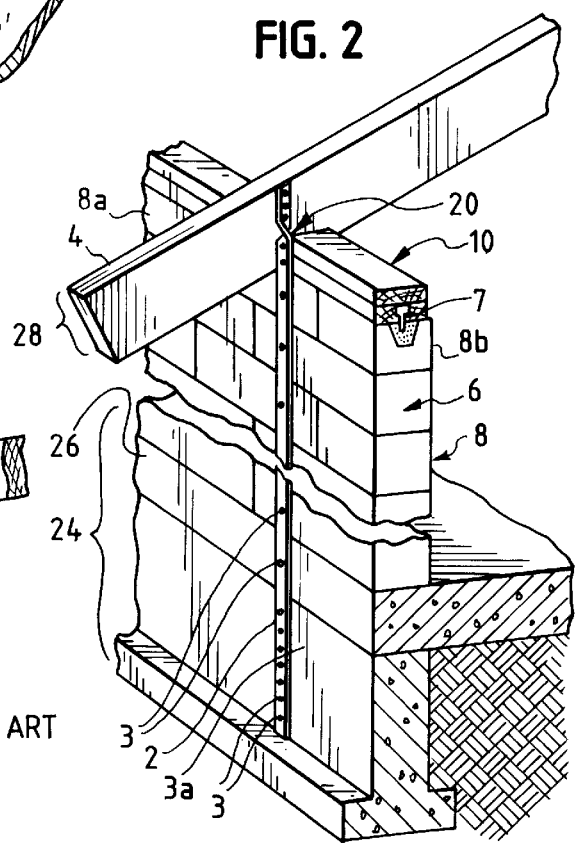
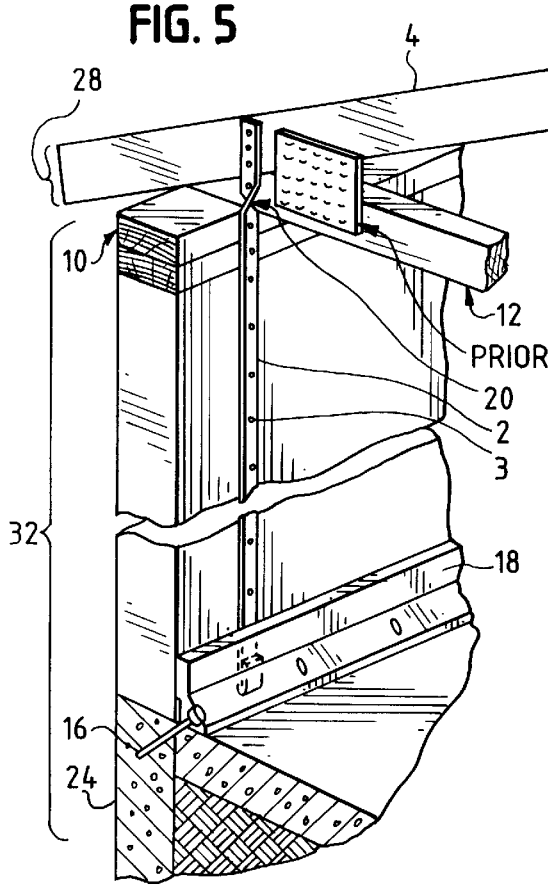
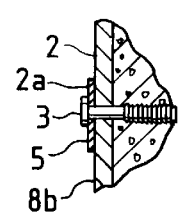
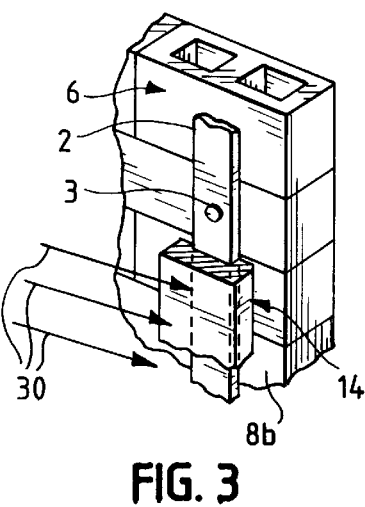

APPARATUS FOR A WIND RESISTANT FASTENER

BACKGROUND OF THE INVENTION

This invention relates to a roof strapping system to aid in securing a roof to a house comprising at least one high tensile strength batten strip disposed adjacent to an exterior wall of a house having a lower end engaged to the foundation (including the slab, if any) and an upper end engaged to the roof structure (i.e. top plate of the wall and/or roof rafter). Batten strips of a polymeric material may require a covering to shield the same from ultra-violet rays. The roof strapping system further comprises a high tensile strength, fire retardant interior wall covering having a bottom edge suitably connected to the floor structure (i.e. anchor bolts) and having a top edge suitably connected to the roof structure.

The invention relates to two means for keeping a roof in place during a hurricane or other high wind situations. One means relates to an external roof strapping system (a preferred embodiment of which is a high tensile strength batten strip of a polymeric material requiring a covering to shield the same from ultra-violet rays) with one end engaged to the foundation/slab and an upper end engaged to the roof structure (i.e. top plate of the wall and/or roof rafter). The second means is a high tensile strength, fire retardant interior wall covering, i.e. a super strong wall paper that extends beyond the wall and is suitably connected to the floor structure and to the roof structure Alternative technology is available in the form of U.S. Pat. No. 5,537,786 issued on Jul. 23, 1996 to Lozier et.al. discloses a hurricane-resisting building roof structure tie-down comprising a plurality of straps, a plurality of anchors secured to the foundation in pairs, on opposite sides of the building, and tie-down strap guides on the bridge of the roof between related anchors.

U.S. Pat. No. 5,257,483 issued in 1993 discloses an upstanding reinforcing tie bar between exposed end of the roof rafter and building.

Another U.S. Pat. No. 4,472,916, shows a prefabricated house construction employing a vertical metal post extending from the foundation which utilizes a slotted tension bolt to attach to the horizontal roof girder.

Additionally, U.S. Pat. No. 5,311,712 uses a high strength interior wall that is insulated and fire retardant but does not provide a roof holding restraint.

Furthermore, U.S. Pat. No. 3,590,540 issued in 1971 discloses prefabricated laminated insulated wall panels.

Some of the drawbacks to these designs are that each teaches exposed structures which affect the aesthetics f the building. Moreover, none of the foregoing inventions is designed to provide auxiliary fastening strength to the existing roof connection.

To alleviate this problem, and others which will become apparent from the disclosure which follows, the present invention conveniently provides an apparatus that may be incorporated into a new building or as a building modification. Still other advantages will be apparent from the disclosure that follows.

The citation of the foregoing publications is not an admission that any particular publication constitutes prior art, or that any publication alone or in conjunction with others, renders unpatentable any pending claim of the present application. None of the cited publications is believed to detract from the patentability of the claimed invention.

SUMMARY OF THE INVENTION

The invention relates to an apparatus for a wind resistant fastener, for fastening a roof structure of a building to a means for supporting said roof structure, comprising a substantially vertical means for securing disposed adjacent to the means for supporting and operatively connecting the roof structure and the means for supporting. It serves as an auxiliary fastener between the roof structure and the support means comprising a foundation and generally vertical exterior walls supported by said foundation.

The apparatus for a wind resistant fastener of the instant invention provides for connecting the means for supporting to the roof structure proximate to a junction where the roof structure abuts the means for supporting.

BRIEF DESCRIPTION OF THE DRAWINGS

Preferred embodiments of the invention are described hereinafter with reference to the accompanying drawing wherein:

FIG. 1 is a fragmentary perspective view of a first preferred embodiment of the apparatus for a wind resistant fastener of the present invention showing a plurality of batten strips disposed on the exterior surface of the generally vertical exterior walls at spaced distances and on either side of the doors and windows.

FIG. 2 is a fragmentary perspective view of the first embodiment of the apparatus for a wind resistant fastener of the present invention showing the batten strip operatively connected to the foundation, including the slab, and the exterior wall and roof structure.

FIG. 3 is a fragmentary perspective view of the first embodiment of the apparatus for a wind resistant fastener of the present invention showing the batten strip attached to a concrete block of the exterior wall and disposed under an elongated covering.

FIG. 4 is a fragmentary side elevation view of the first embodiment of the apparatus for a wind resistant fastener of the present invention showing the batten strip secured to a means for supporting by a bolt and a washer.

FIG. 5 is a fragmentary perspective view of a second preferred embodiment of the apparatus for a wind resistant fastener of the present invention with the batten strip disposed on the interior surface of the exterior wall.

DETAILED DESCRIPTION OF THE INVENTION

Figure 6:
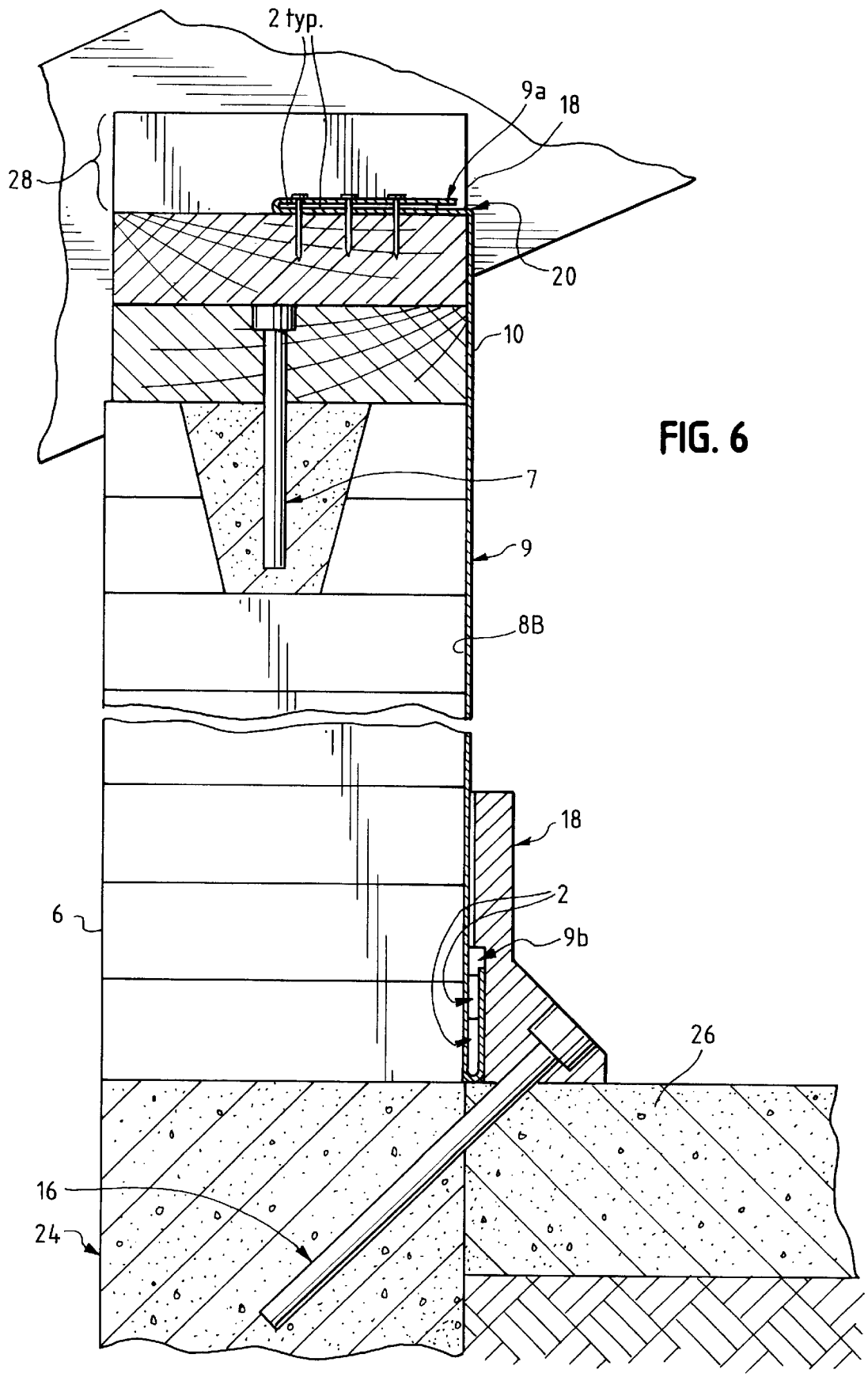
FIG. 6 is a side elevation of a third preferred embodiment of the apparatus for a wind resistant fastener of the present invention showing a high tensile strength wall covering disposed on an interior surface of one of the generally vertical exterior walls with a top end of the wall covering upwardly connected to a top plate, a member of the roof structure, and a bottom end of the wall covering secured to the foundation by a means for anchoring.

The preferred embodiments depicted in the drawing include an apparatus for a wind resistant fastener for fastening a roof structure of a building to a means for supporting 32 the roof structure comprising a substantially vertical means for securing disposed adjacent to the means for supporting 32 and operatively connecting the roof structure 28 and the means for supporting. The building may have a foundation 24 and generally vertical exterior walls 8 supported by said foundation. The means for securing is preferably not merely upstanding, but vertical; and it is preferably disposed on the surface of the walls rather than being imbedded in them. This latter aspect facilitates adding the apparatus to an existing building. The discussion that follows, without limiting the scope of the invention, will refer to the invention as depicted in the drawing.

In a preferred embodiment of the apparatus of the present invention, the means for securing operatively connects the means for supporting 32 to the roof structure 28 proximate to the junction 20 where the roof structure abuts the means for supporting. The means for securing may also connect to the roof structure at any place along the vertical line of the batten strip 2. Clearly, the flexible batten may be secured to non-vertical surfaces of the components of the structure, nonetheless, the securing surfaces are generally proximate to the plane of the external wall 8 of the means for supporting 32. The means for securing provides supplemental fastening strength to the basic construction connection between the roof structure and the means for supporting.

As contemplated in a preferred embodiment of the apparatus of the present invention, the means for securing comprises means for preventing uplifting separation of the roof structure from the means for supporting while leaving the roof structure free to rest upon the means for supporting. The means for securing provides no resistance to downward compression.

As shown in FIG. 1, the means for supporting comprises a foundation 24 and a plurality of generally vertical exterior walls 8 supported by the foundation and wherein the means for securing is disposed adjacent to at least one of the plurality of generally vertical exterior walls. See particularly FIGS. 2, 5 and 6, where the means for securing is shown operatively connected to at least one of the plurality of generally vertical exterior walls.

In a preferred embodiment of the apparatus of the present invention, each of the plurality of generally vertical exterior walls comprises a vertical arrangement of concrete blocks 6, as shown in FIG. 2, and the means for securing comprises at least one elongated strap operatively connected to each of the concrete blocks that are substantially vertically adjacent to the at least one elongated strap.

In a preferred embodiment of the apparatus of the present invention, each of the at least one elongated strap comprises a batten strip 2. Each batten strip may further comprise a plurality of holes 2a, each disposed at a spaced distance along the length of the batten strip 2, and a corresponding number of bolts 3 to secure the batten strip to the concrete blocks 6 and the other elements of the means for supporting.

The batten strip 2 can be secured to the existing concrete foundation with ITW Buildex plastic three inch bolts 3 which may be epoxied in place which securing is preferably done at two inch intervals. In the concrete block wall, however, the centers of the bolts should preferably be placed six inches apart.

In a preferred embodiment of the apparatus of the present invention, the means for securing is operatively connected to the foundation. Furthermore, the batten strip 2 should preferably be extended to eighteen inches below the bottom of the wall 8 and connected to the foundation 24 along such extension.

A preferred form of batten strip is one manufactured by Buildex division of Illinois Tool Works, Itasca, Ill., which is made from a polyolyfin resin. Said polymer batten strip is an elongated flat thin strap as shown in the drawings with a preferred width of approximately one inch.

The Buildex polymer batten strip manufactured by Buildex has a melting point of approximately 300° F. which is suitable for the use cited in this application. The ITW Buildex polymer batten strip is prepackaged in 250 foot coils and has been used to secure layered sheets of horizontal roofing material. The polymer batten strip has an excellent resistant to ultraviolet light, however, for long term use, it is preferred that an appropriate elongated covering 14 be added.

ITW Buildex also produces many appropriate fasteners, i.e., bolts. Preferably the bolts should be plastic or corrosion resistant metal. A preferred product bears the trade name of Maxi-Set Tapcon®. These bolts have built in flanges which eliminate a separate washer. Other suitable equipment bolts may be used to secure the batten to the building structure either with or without washers 5. The washers, however, provide greater overall tensile strength for the featured batten. The preferred washer 5 for the apparatus as disclosed is a Belleville washer, as shown in FIG. 4.

Referring to FIG. 1, wherein it is shown a preferred disposition of the means for securing adjacent to any doors and windows disposed in the generally vertical exterior walls of the building. The spaced distance between each batten will vary depending upon the presence of windows or doors in the exterior walls. Battens should be placed on each side of a window and each side of a door and for other locations at split distances of three feet or greater.

In a preferred embodiment of the apparatus of the present invention, the means for securing is operatively connected to at least one of the plurality of generally vertical exterior walls 8 and the foundation 24.

A preferred embodiment of the apparatus of the present invention shown in FIG. 3, provides for the means for securing to be disposed on an exterior surface 8a of at least one of the plurality of generally vertical exterior walls 8 and further comprises an elongated covering 14 to protect the polymer batten strip 2 from ultra violet rays 30.

As best shown in FIG. 6, a third preferred embodiment of the apparatus of the present invention provides for the means for securing comprising a high tensile strength wall covering 9 disposed on an interior surface 8b of at least one of the plurality of generally vertical exterior walls 8. This flexible wall covering 9 is preferably Baycor White FR/UV sandblasting fabric that is 121 inches wide and has a tensile strength of approximately 280 pounds per square inch which is available through Baycor Products Group of Norcross, Ga.

In a preferred embodiment of the apparatus of the present invention shown in FIG. 6, the high tensile strength wall covering 9 has a top end 9a extending upwardly from the at least one of the plurality of generally vertical exterior walls and a bottom end 9b extending downwardly from the generally vertical exterior wall, and wherein the top end 9a of the high tensile strength wall covering 9 is operatively connected to a means for interfacing the roof structure 28 to the means for supporting 32, the means for interfacing comprising one of a top plate 10 of the generally vertical exterior wall 8 and a block 18 of the roof structure, and wherein the bottom end 9b of the high tensile strength wall covering 9 is operatively connected to the means for supporting 32.

In a preferred embodiment of the apparatus of the present invention, the top end 9a of the high tensile strength wall covering is folded around a plurality of parallel horizontally disposed batten strips 2 forming a securable top end, the securable top end being bolted to the means for interfacing. Three continuous strips of ITW polymer batten strip disposed parallel to the plate to which the top end of the wall covering is secured is preferred and provides an additional fixturing of the top end of the wall covering 9.

Furthermore, the bottom end 9b of the high tensile strength wall covering is folded around a plurality of parallel horizontally disposed batten strips 2 forming a securable bottom end, the securable bottom end being anchored to at least one of the foundation 24 and a floor slab 26.

In a preferred embodiment of the apparatus for a wind resistant fastener for fastening a roof structure of a building to a means for supporting the roof structure of the present invention, the means for supporting comprises a foundation 24 and a plurality of generally vertical exterior walls 8 supported by the foundation, comprising a substantially vertical means for securing disposed adjacent to the means for supporting and operatively connecting the roof structure and the means for supporting, said means for securing is disposed adjacent to at least one of the plurality of generally vertical exterior walls and operatively connects the means for supporting to the roof structure proximate to a junction where the roof structure abuts the means for supporting.

Additionally, each of the plurality of generally vertical exterior walls 8 comprises a vertical arrangement of concrete blocks 6 and the means for securing comprises at least one elongated strap operatively connected to each of the concrete blocks that are substantially vertically adjacent to the at least one elongated strap, each of the at least one elongated strap comprises a batten strip 2 with a plurality of holes 2a, each disposed at a spaced distance along the length of the batten strip, and a corresponding number of bolts 3 to secure the batten strip 2 to the concrete blocks, said batten strips being disposed on an exterior surface 8a of at least one of the plurality of generally vertical exterior walls 8.

Referring to FIG. 6, in a preferred embodiment of the apparatus of the present invention, the means for supporting comprises a foundation and a plurality of generally vertical exterior walls supported by the foundation, comprises a substantially vertical means for securing disposed adjacent to the means for supporting 32 and operatively connecting the roof structure 28 and the means for supporting 32. The means for securing is disposed adjacent to at least one of the plurality of generally vertical exterior walls 8 and comprises a high tensile strength wall covering disposed on an interior surface of at least one of the plurality of generally vertical exterior walls.

The high tensile strength wall covering 9 has a top end 9a extending upwardly from the at least one of the plurality of generally vertical exterior walls 8 and a bottom end 9b extending downwardly from the generally vertical exterior wall. The top end of the high tensile strength wall covering being operatively connected to a means for interfacing 34 the roof structure 28 to the means for supporting. The means for interfacing comprises one of a top plate 10 of the generally vertical exterior wall 8 and a structural element of the roof structure 28 which would include a block 18 for securing, and the bottom end 9b of the high tensile strength wall covering 9 is operatively connected to the means for supporting 32, said top end of the high tensile strength wall covering is folded around a plurality of parallel horizontally disposed batten strips 2 forming an securable top end. The securable top end is bolted to the means for interfacing and the bottom end of the high tensile strength wall covering is folded around a plurality of parallel horizontally disposed batten strips forming an securable bottom end. The securable bottom end, best shown in FIG. 6, being anchored to at least one of the foundation and a floor slab.

While this invention has been described in connection with the best mode presently contemplated by the inventor for carrying out his invention, the preferred embodiments described and shown are for purposes of illustration only, and are not to be construed as constituting any limitations of the invention. Modifications will be obvious to those skilled in the art, and all modifications that do not depart from the spirit of the invention are intended to be included within the scope of the appended claims.

The invention resides not in any one of these features per se, but rather in the particular combination of all of them herein disclosed and claimed and it is distinguished from the prior art in this particular combination of all of its structures for the function specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing description is to enable the U.S. Patent and Trademark Office and the public generally, and especially the scientist, engineers and practitioners in the art who are not familiar with patent or legal terms of phraseology, to determine quickly from a cursory inspection the nature and essence of the technical disclosure of the application. The description is neither intended to define the invention of the application, which is measured by the claims, nor is it intended to be limiting as to the scope of the invention in any way.

These together with other objects of the invention, along with the various features of novelty which characterize the invention are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is a follows:

1. An apparatus for a wind resistant fastener, for fastening a roof structure of a building to a means for supporting said roof structure, comprising a substantially vertical means for securing engaged along the means for supporting operatively connecting the roof structure and the means for supporting, said means for securing originates at the means for supporting and extends to and terminates proximate to a junction where the roof structure abuts the means for supporting.

2. The apparatus for a wind resistant fastener of claim 1, wherein the means for securing directly fastens the means for supporting to the roof structure at a junction where the roof structure abuts the means for supporting.

3. The apparatus for a wind resistant fastener of claim 1, wherein the means for securing comprises means for preventing uplifting separation of the roof structure from the means for supporting while leaving said roof structure free to rest upon the means for supporting.

4. The apparatus for a wind resistant fastener of claim 1, wherein the means for supporting comprises a foundation and a plurality of generally vertical exterior walls supported by said foundation and wherein the means for securing is disposed on at least one of said plurality of generally vertical exterior walls.

5. The apparatus for a wind resistant fastener of claim 4, wherein the means for securing is operatively connected to at least one of said plurality of generally vertical exterior walls.

6. The apparatus for a wind resistant fastener of claim 5, wherein each of said plurality of generally vertical exterior walls comprises a vertical arrangement of concrete blocks and the means for securing comprises at least one elongated strap operatively connected to each of the concrete blocks that are substantially vertically adjacent to said at least one elongated strap.

7. The apparatus for a wind resistant fastener of claim 6, wherein each of said at least one elongated strap comprises a batten strip.

8. The apparatus for a wind resistant fastener of claim 7, wherein each batten strip comprises a plurality of holes, each disposed at a spaced distance along the length of the batten strip, and a corresponding number of bolts to secure the batten strip to said concrete blocks.

9. The apparatus for a wind resistant fastener of claim 7, wherein the batten strip is composed of a polymer.

10. An apparatus for a wind resistant fastener, for fastening a roof structure of a building to a means for supporting said roof structure wherein the means for supporting comprises a foundation and a plurality of generally vertical exterior walls supported by said foundation, each of said plurality of generally vertical exterior walls comprises a vertical arrangement of concrete blocks, comprising a substantially vertical means for securing operatively connecting the roof structure and the means for supporting, the means for securing is disposed adjacent to at least one of said plurality of generally vertical exterior walls and is operatively connected to the at least one of said plurality of generally vertical exterior walls, the means for securing has at least one elongated strap operatively connected to each of the concrete blocks that are substantially vertically adjacent to said at least one elongated strap, each of said at least one elongated strap comprises a batten strip composed of a polymer, and the means for securing is disposed on an exterior surface of the at least one of said plurality of generally vertical exterior walls and further comprises an elongated covering to protect the polymer batten strip from ultra violet rays.

11. The apparatus for a wind resistant fastener of claim 4, wherein means for securing is disposed adjacent to any doors and windows disposed in the generally vertical exterior walls of said building.

12. The apparatus for a wind resistant fastener of claim 1, wherein the means for securing is operatively connected to an interior surface of at least one of said plurality of generally vertical exterior walls and comprises at least one elongated strap.

13. The apparatus for a wind resistant fastener of claim 4, wherein the means for securing is operatively connected to an exterior surface of at least one of said plurality of generally vertical exterior walls and comprises at least one elongated strap.

14. The apparatus for a wind resistant fastener of claim 13, wherein the means for securing comprises a high tensile strength wall covering disposed on an interior surface of at least one of said plurality of generally vertical exterior walls.

15. An apparatus for a wind resistant fastener, for fastening a roof structure of a building to a means for supporting said roof structure, comprising a substantially vertical means for securing disposed adjacent to the means for supporting operatively connecting the roof structure and the means for supporting, wherein the means for supporting comprises a foundation and a plurality of generally vertical exterior walls supported by said foundation and wherein the means for securing is disposed adjacent to at least one of said plurality of generally vertical exterior walls and comprises a high tensile strength wall covering disposed on an interior surface of at least one of said plurality of generally vertical exterior walls and is operatively connected to at least one of said plurality of generally vertical exterior walls and the foundation, the high tensile strength wall covering has a top end extending upwardly from the at least one of said plurality of generally vertical exterior walls and a bottom end extending downwardly from said generally vertical exterior wall, and wherein the top end of said high tensile strength wall covering is operatively connected to a means for interfacing the roof structure to the means for supporting, said means for interfacing comprising one of a top plate of the generally vertical exterior wall and a block of the roof structure, and wherein the bottom end of said high tensile strength wall covering is operatively connected to the means for supporting.

16. The apparatus for a wind resistant fastener of claim 15, wherein the top end of said high tensile strength wall covering is folded around a plurality of parallel horizontally disposed batten strips forming an securable top end, said securable top end being bolted to the means for interfacing.

17. The apparatus for a wind resistant fastener of claim 15, wherein the bottom end of said high tensile strength wall covering is folded around a plurality of parallel horizontally disposed batten strips forming an securable bottom end, said securable bottom end being anchored to at least one of the foundation and a floor slab.

18. An apparatus for a wind resistant fastener for fastening a roof structure of a building to a means for supporting said roof structure, said means for supporting comprises a foundation and a plurality of generally vertical exterior walls supported by said foundation, comprising:

a substantially vertical means for securing engaged along the means for supporting and operatively connecting the roof structure and the means for supporting;

said means for securing is disposed adjacent to at least one of said plurality of generally vertical exterior walls and directly fastens the means for supporting to the roof structure at a junction where the roof structure abuts the means for supporting, said means for securing originates at the means for supporting and extends to and terminates proximate to a junction where the roof structure abuts the means for supporting.

19. The apparatus for a wind resistant fastener of claim 18, wherein each of said plurality of generally vertical exterior walls comprises a vertical arrangement of concrete blocks and the means for securing comprises at least one elongated strap operatively connected to each of the concrete blocks that are substantially vertically adjacent to said at least one elongated strap, each of said at least one elongated strap comprises a batten strip with a plurality of holes, each disposed at a spaced distance along the length of the batten strip, and a corresponding number of bolts to secure the batten strip to said concrete blocks, said batten strips being disposed on an exterior surface of at least one of said plurality of generally vertical exterior walls.

20. An apparatus for a wind resistant fastener for fastening a roof structure of a building to a means for supporting said roof structure, said means for supporting comprises a foundation and a plurality of generally vertical exterior walls supported by said foundation, comprising a substantially vertical means for securing disposed adjacent to the means for supporting and operatively connecting the roof structure and the means for supporting, said means for securing being disposed adjacent to at least one of said plurality of generally vertical exterior walls, said means for securing comprises a high tensile strength wall covering disposed on an interior surface of at least one of said plurality of generally vertical exterior walls, said high tensile strength wall covering having a top end extending upwardly from the at least one of said plurality of generally vertical exterior walls and a bottom end extending downwardly from said generally vertical exterior wall, said top end of said high tensile strength wall covering being operatively connected to a means for interfacing the roof structure to the means for supporting, said means for interfacing comprising one of a top plate of the generally vertical exterior wall and a block of the roof structure, and wherein the bottom end of said high tensile strength wall covering being operatively connected to the means for supporting, said top end of said high tensile strength wall covering is folded around a plurality of parallel horizontally disposed batten strips forming an securable top end, said securable top end being bolted to the means for interfacing, and said bottom end of said high tensile strength wall covering is folded around a plurality of parallel horizontally disposed batten strips forming an securable bottom end, said securable bottom end being anchored to at least one of the foundation and a floor slab.

* * * * *